(12) United States Patent
Goldenberg et al.

(10) Patent No.: US 11,465,547 B1
(45) Date of Patent: *Oct. 11, 2022

(54) TOY HAULER RECREATIONAL VEHICLE

(71) Applicant: Grand Design RV, LLC, Middlebury, IN (US)

(72) Inventors: Nathan Goldenberg, Granger, IN (US); Ryan B. Getz, Goshen, IN (US); Thomas R. Cramer, Elkhart, IN (US)

(73) Assignee: Grand Design RV, LLC, Middlebury, IN (US)

( * ) Notice: Subject to any disclaimer, the term of this patent is extended or adjusted under 35 U.S.C. 154(b) by 8 days.

This patent is subject to a terminal disclaimer.

(21) Appl. No.: 15/930,731

(22) Filed: May 13, 2020

Related U.S. Application Data

(63) Continuation of application No. 16/058,518, filed on Aug. 8, 2018, now Pat. No. 10,654,398, which is a continuation of application No. 15/267,562, filed on Sep. 16, 2016, now Pat. No. 10,046,690.

(51) Int. Cl.
*B60P 3/39* (2006.01)
*B60P 3/34* (2006.01)

(52) U.S. Cl.
CPC .. *B60P 3/39* (2013.01); *B60P 3/34* (2013.01)

(58) Field of Classification Search
CPC Y10T 29/49622; B62D 21/02; B62D 33/046; B60P 3/39; B60P 3/34; B60P 3/32; B60P 3/341; B60R 13/06; B60J 10/00
See application file for complete search history.

(56) References Cited

U.S. PATENT DOCUMENTS

| 2,541,288 A | 2/1951 | Rice |
| 2,757,418 A | 8/1956 | Bergstrom |
| 3,287,058 A | 11/1966 | Wells |
| 3,891,231 A | 6/1975 | Snoberger et al. |
| 3,961,716 A | 6/1976 | Renaud |

(Continued)

FOREIGN PATENT DOCUMENTS

| DE | 102005036590 A1 | 3/2006 |
| EP | 0748718 B1 | 12/1996 |

(Continued)

OTHER PUBLICATIONS

Fun Mover 2008 Product Brochure, Four Winds International (2008), www.FUNMOVER-RV.com, 16 pages.

(Continued)

*Primary Examiner* — Kiran B Patel
(74) *Attorney, Agent, or Firm* — Faegre Drinker Biddle & Reath LLP

(57) ABSTRACT

A toy hauler recreational vehicle includes a first area having a first floor located at a first level, a second area having a second floor located at a second level that is lower than the first level, and a third area having a third floor located at a third level that is higher than the second level. The second area is positioned between the first area and the third area. The recreational vehicle also includes a garage area with a garage floor located at a fourth level that is lower than the third level. The garage area includes a ceiling that is movable between a lower height and an upper height. The recreational vehicle also includes a bed positioned above the ceiling and that is movable between a lowered position and a raised position.

20 Claims, 12 Drawing Sheets

(56) References Cited

U.S. PATENT DOCUMENTS

| | | | |
|---|---|---|---|
| 4,049,310 A | 9/1977 | Yoder | |
| 4,144,979 A | 3/1979 | Leach, Jr. et al. | |
| 4,253,699 A | 3/1981 | Frank | |
| 4,268,209 A | 5/1981 | Westerman | |
| 4,854,631 A * | 8/1989 | Laursen | B60P 3/32 |
| | | | 296/158 |
| 4,869,545 A * | 9/1989 | Notermann | B60P 3/1041 |
| | | | 296/157 |
| 5,031,563 A | 7/1991 | Matre | |
| 5,314,205 A | 5/1994 | Glesmann | |
| 5,342,106 A * | 8/1994 | Fischer | B62D 27/04 |
| | | | 296/164 |
| 5,374,094 A | 12/1994 | Smith et al. | |
| 5,491,933 A | 2/1996 | Miller et al. | |
| 5,577,351 A | 11/1996 | Dewald, Jr. et al. | |
| 5,921,615 A * | 7/1999 | Gimenez | B62D 25/2054 |
| | | | 296/164 |
| 5,967,583 A | 10/1999 | Wishart | |
| 6,135,532 A * | 10/2000 | Martin | B60P 1/435 |
| | | | 14/71.1 |
| 6,170,903 B1 * | 1/2001 | Crean | B60P 3/34 |
| | | | 296/168 |
| 6,231,114 B1 | 5/2001 | Warmoth | |
| 6,231,115 B1 | 5/2001 | Crean | |
| 6,290,284 B1 * | 9/2001 | Crean | B60P 3/34 |
| | | | 296/168 |
| 6,439,648 B1 | 8/2002 | Crean | |
| 6,494,285 B1 | 12/2002 | Williams | |
| 6,502,894 B1 * | 1/2003 | Ingram | B60P 3/36 |
| | | | 280/789 |
| 6,557,190 B2 | 5/2003 | Bailey | |
| 6,692,062 B1 * | 2/2004 | Woodard | B60P 3/32 |
| | | | 296/164 |
| 6,729,678 B1 * | 5/2004 | Atcravi | B60P 3/34 |
| | | | 296/165 |
| 6,860,545 B1 | 3/2005 | Ingram et al. | |
| 6,899,375 B2 | 5/2005 | Sankrithi et al. | |
| 6,981,728 B2 | 1/2006 | Rasmussen | |
| 6,983,979 B2 * | 1/2006 | Rasmussen | A47C 17/84 |
| | | | 296/156 |
| 6,983,980 B2 | 1/2006 | Rasmussen | |
| 6,988,760 B2 | 1/2006 | Rasmussen | |
| 7,111,897 B2 | 9/2006 | Ingram et al. | |
| 7,147,268 B2 | 12/2006 | Winter | |
| 7,150,483 B2 | 12/2006 | Rasmussen | |
| 7,198,320 B2 | 4/2007 | Rasmussen | |
| 7,240,945 B1 * | 7/2007 | Crean | B60R 11/02 |
| | | | 296/37.7 |
| 7,325,860 B2 | 2/2008 | Day | |
| 7,334,827 B1 * | 2/2008 | Crean | B60P 3/34 |
| | | | 296/26.01 |
| 7,338,109 B1 * | 3/2008 | Crean | B60P 3/34 |
| | | | 296/164 |
| 7,347,484 B2 | 3/2008 | Nebel | |
| 7,610,636 B2 | 11/2009 | Holmes et al. | |
| 7,618,085 B1 | 11/2009 | Bean | |
| 7,878,545 B2 * | 2/2011 | Rhymer | B60P 3/36 |
| | | | 280/789 |
| 7,967,338 B1 * | 6/2011 | Anderson | B60P 3/36 |
| | | | 280/789 |
| 8,167,329 B2 | 5/2012 | Lee | |
| 8,419,037 B2 | 4/2013 | Graber et al. | |
| 8,505,974 B2 | 8/2013 | Rhymer et al. | |
| 8,590,917 B2 | 11/2013 | Lee | |
| 8,864,206 B2 | 10/2014 | Miller et al. | |
| 8,911,196 B2 * | 12/2014 | Cazes | B60P 3/34 |
| | | | 414/470 |
| 8,983,979 B2 | 3/2015 | Sauer | |
| 9,290,213 B2 | 3/2016 | Connor | |
| 9,409,603 B2 | 8/2016 | Garceau | |
| 9,604,564 B1 * | 3/2017 | Pellicer | B60P 3/34 |
| 10,046,690 B1 | 8/2018 | Goldenberg et al. | |
| 10,654,398 B1 | 5/2020 | Goldenberg et al. | |
| 2002/0043812 A1 * | 4/2002 | Crean | B62D 21/02 |
| | | | 296/26.13 |
| 2002/0066184 A1 * | 6/2002 | Crean | B62D 33/046 |
| | | | 29/897.2 |
| 2003/0099532 A1 * | 5/2003 | Williams | B60P 3/36 |
| | | | 414/538 |
| 2004/0261267 A1 * | 12/2004 | Crean | B60P 3/36 |
| | | | 29/897.2 |
| 2005/0161974 A1 | 7/2005 | Atcravi | |
| 2006/0066131 A1 | 3/2006 | Nebel | |
| 2006/0108784 A1 | 5/2006 | Van Der Bijl | |
| 2007/0007793 A1 * | 1/2007 | Crean | B60R 13/0815 |
| | | | 296/156 |
| 2007/0007794 A1 * | 1/2007 | Bertoch | B62D 33/044 |
| | | | 296/168 |
| 2008/0001427 A1 * | 1/2008 | Day | B60P 3/36 |
| | | | 296/156 |
| 2009/0102231 A1 * | 4/2009 | Atcravi | B60P 3/34 |
| | | | 296/175 |
| 2009/0134600 A1 * | 5/2009 | Tinley | B62D 21/20 |
| | | | 280/441.2 |
| 2009/0159108 A1 * | 6/2009 | Dannewitz | B60P 3/064 |
| | | | 135/88.05 |
| 2010/0127477 A1 * | 5/2010 | Ousley | B62D 53/0842 |
| | | | 280/433 |
| 2012/0220176 A1 * | 8/2012 | Neprud | B60F 3/00 |
| | | | 440/12.52 |
| 2012/0261902 A1 * | 10/2012 | Graber | B62D 21/20 |
| | | | 280/433 |
| 2014/0004761 A1 * | 1/2014 | Neprud | B60F 3/00 |
| | | | 440/12.52 |
| 2015/0291229 A1 * | 10/2015 | Connor | B60P 3/36 |
| | | | 296/168 |
| 2015/0291236 A1 * | 10/2015 | Kseizopolski | F16J 15/50 |
| | | | 277/637 |
| 2015/0329035 A1 | 11/2015 | Johnson et al. | |
| 2016/0096465 A1 | 4/2016 | Kauffman et al. | |
| 2016/0144767 A1 | 5/2016 | Snell | |
| 2016/0347230 A1 * | 12/2016 | Pellicer | B60P 3/39 |
| 2017/0113594 A1 * | 4/2017 | Pellicer | B62D 63/061 |

FOREIGN PATENT DOCUMENTS

| | | |
|---|---|---|
| EP | 1405760 A1 | 4/2004 |
| GB | 911971 A | 12/1962 |
| GB | 1216541 A | 12/1970 |
| GB | 2103551 A | 2/1983 |
| WO | 2007143774 A1 | 12/2007 |
| WO | 2011107289 A1 | 9/2011 |

OTHER PUBLICATIONS

Open Road RV Center, 2005 Travel Supreme Travel Supreme 41DS02B Internet Sales Ad, Printed Jun. 25, 2019 from https://www.openroadrvcenter.com/inv/2005-Travel-Supreme-Travel-Supreme-41DS02B-CO272/; 5 pages.

Ray Citte RV, 2011 Dutchmen Denali 280 Lbs—Internet Sales Ad, Printed Jun. 25, 2019 from https://www.raycitte.com/rv/roy+ut/dutchmen+fifthwheel/2499/dutchmen+denali+280lbs; 8 pages.

RV Trader Internet Sales Listing for 2006 Travel Supreme 41DS 02B ME, Printed Jun. 25, 2019 from https://www.rvtrader.com/listing/2006-Travel-Supreme-TRAVEL-SUPREME-41DS-02B-ME-5007717705, 7 pages.

RVSellersUSA.com Internet Sales Listing for 2006 Travel Supreme 41DS 02B, Printed Jun. 25, 2019 from https://www.rvsellersusa.com/for_sale_by_owner/2006_Travel_Supreme_41DS-02B/7215, 5 pages.

RV Trader Internet Sales Listing for 2006 Keystone RAPTOR 3814SS, Printed Oct. 19, 2020, from https://www.rvtrader.com/listing/2006-Keystone-RAPTOR-3814SS-5013263975, 18 pages.

J.D. Power NADAGuides.com Specifications listing for 2013 Heartland RV's—Torque Toy Hauler Fifth Wheel Series M-291 Specs, Printed Oct. 19, 2020, from https://www.nadaguides.com/RVs/2013/Heartland-RVs/M-291/6024219/Specs, 2 pages.

(56) References Cited

OTHER PUBLICATIONS

RV Trader Internet Sales Listing for 2013 Heartland TORQUE 301, Printed Oct. 19, 2020, from https://www.rvtrader.com/listing/2013-Heartland-TORQUE-301-5014314890, 11 pages.
Torque by Heartland Product Brochure, Heartland Recreational Vehicles (2013), 2 pages.
Petition for inter partes review for U.S. Pat. No. 10,046,690, filed Jan. 11, 2022, 94 pages.
Exhibit 1002—Raptor Toy Hauler brochure, Mar. 24, 2013, 24 pages.
Exhibit 1003—New Vision brochure, 2008, 19 pages.
Exhibit 1004—Sunset Trail brochure, Nov. 2014, 12 pages.
Exhibit 1012—Declaration of Bruce Hopkins, 93 pages.
Exhibit 1013—Declaration of James Keough, 98 pages.
Exhibit 1014—Declaration of Gary Denton, 88 pages.
Exhibit 1015—Torque Toy Hauler brochure, 2014, 4 pages.
Exhibit 1016—Wild Thing Toy Hauler brochure, Jul. 2005, 8 pages.
Exhibit 1022—Enlarge excerpt of Ex. 1002, p. 12.
Exhibit 1023—Enlarge excerpt of Ex. 1002, p. 14.
Exhibit 1025—RV Business article, Sep. 28, 2006 re Fleetwood, 94 pages.
Exhibit 1026—RV Business article, Sep. 29, 2006 re Fleetwood, 4 pages.
Exhibit 1027—RV Business article, Jul. 17, 2013 re EverGreen, 5 pages.
Exhibit 1034—Wide Body 2007 brochure, 32 pages.
Exhibit 1041—RV Business article, Jan. 13, 2016 re Grand Design, 4 pages.
Exhibit 1042—Jun. 2008 Web Archive of kz-rv.com, 2 pages.
Exhibit 1043—2006 Dutchman Victory Lane brochure, 8 pages.
Exhibit 1044—2007 Dutchman Wild Thing brochure, 8 pages.
Exhibit 1045—Mar. 2013 Web Archive of KeystoneRV.com, 2 pages.
Exhibit 1046—Jul. 2014 Web Archive of HeartlandRvs.com, 2 pages.
Exhibit 1047—2012 Canyon Star brochure, 13 pages.
Exhibit 1048—Feb. 2014 Web Archive of CrossroadsRV.com, 2 pages.
Exhibit 1049—Declaration of Duncan Hall and Exhibit, 13 pages.
Exhibit 1054—2005 Holiday Rambler Ambassador brochure, 20 pages.
Exhibit 1055—2009 Raptor brochure, 8 pages.
Exhibit 1056—2011 Holiday Rambler Vacationer brochure, 5 pages.
Exhibit 1057—Toy Toters article, familyRVing magazine, Aug. 1, 2007, 9 pages.
Exhibit 1058—2008 KZ, New Vision Sportster brochure, 8 pages.
Exhibit 1059—2010 Road warrior brochure, 16 pages.
Exhibit 1060—2012 Holiday Rambler Aluma-Lite brochure, 8 pages.
Exhibit 1061—2013 ACE Class A RV brochure, 2 pages.
Exhibit 1062—2013 ACE Motorhomes brochure, 4 pages.
Exhibit 1063—2013 Ambassador brochure, 4 pages.
Exhibit 1064—2013 Augusta brochure, 4 pages.
Exhibit 1065—2013 Vacationer brochure, 4 pages.
Exhibit 1066—2014 Canyon Star brochure, 24 pages.
Exhibit 1067—2015 Sanibel brochure, 12 pages.
Exhibit 1068—2015 Spartan brochure, 12 pages.
Exhibit 1069—2008 Fleetwood Pegasus brochure, 6 pages.
Exhibit 1070—2014 Freelander brochure, 8 pages.
Exhibit 1071—2014 Leprechaun brochure, 8 pages.
Exhibit 1072—2015 Raptor brochure, 16 pages.
Exhibit 1073—Declaration of Ashley Jones re Exs. 1015 and 1046, 3 pages.
Exhibit 1074—Declaration of Kimberly Dooley re Exs. 1002, 1004, 1016, 1043, and 1044, 5 pages.
Exhibit 1075—Declaration of Marlene Snyder re Exs. 1003 and 1042, 3 pages.
Exhibit 1076—Declaration of Katherine Bangtson re Exs. 1025-27, 1041, 3 pages.
Exhibit 1077—Enlarged and segregated views of Fig. 12 of the Petition, 5 pages.
Exhibit 1078—Declaration of Katherine Bangston re Ex. 1047, 2 pages.
Patent Owner's Preliminary Response before the Patent Trial and Appeal Board, *Thor Industries, Inc et al.* v. *Grand Design RV, LLC,* Case IPR2022-00411, U.S. Pat. No. 10,046,690, filed Apr. 19, 2022, paper No. 7, 73 pages.
Patent Owner's List of Exhibits, *Thor Industries, Inc et al.* v. *Grand Design RV, LLC,* Case IPR2022-00411, U.S. Pat No. 10,046,690, filed Apr. 19, 2022, paper No. 8, 2 pages.
Patent Owner's Exhibit 2001, "Declaration of Dr. Charles F. Reinholtz in Support of Patent Owner's Preliminary Response", *Thor Industries, Inc. et al.* v. *Grand Design RV, LLC,* Case IPR2022-00411, U.S. Pat. No. 10,046,690, 62 pages.
Patent Owner's Exhibit 2002, "Curriculum Vitae of Dr. Charles F. Reinholtz", *Thor Industries, Inc. et al.* v. *Grand Design RV, LLC,* Case IPR2022-00411, U.S. Pat. No. 10,046,690, 22 pages.
Patent Owner's Exhibit 2003, "McGraw-Hill Dictionary of Scientific and Technical Terms, Copyright 1974", *Thor Industries, Inc. et al.* v. *Grand Design RV, LLC,* Case IPR2022-00411, U.S. Pat. No. 10,046,690, 4 pages.
Patent Owner's Exhibit 2004, "Hibbeler, R.C., Engineering Mechanics Statics, 8th ed., 1998, ISBN 0-13-577032-7", *Thor Industries, Inc. et al.* v. *Grand Design RV, LLC,* Case IPR2022-00411, U.S. Pat. No. 10,046,690, 5 pages.
Patent Owner's Exhibit 2005, "Miriam, J. L., L.G. Kraige, Engineering Mechanics Statics, 6th ed., ISBN-13 978-0-471-73932-6, 2007", *Thor Industries, Inc. et al.* v. *Grand Design RV, LLC,* Case IPR2022-00411, U.S. Pat. No. 10,046,690, 6 pages.
Patent Owner's Exhibit 2006, "https://horizonsrv.com/our-chassis-may-be-the-sole-reason-you-choose-a-new-orizons-fifth-wheel-find-out-why!", *Thor Industries, Inc. et al.* v. *Grand Design RV, LLC,* Case PR2022-00411, U.S. Pat. No. 10,046,690, 5 pages.
Patent Owner's Exhibit 2008, "https://horizonsrv.com/why-new-horizons/chassis/", *Thor Industries, Inc. et al.* v. *Grand Design RV, LLC,* Case IPR2022-00411, U.S. Pat. No. 10,046,690, 6 pages.
Patent Owner's Exhibit 2009, "https://coastalscience.noaa.gov/data_reports/aquatic-invasive-secies-transport-via-trailered-boats-what-is-being-moved-who-is-moving-it-and-what-can-be-done/", *Thor Industries, Inc. et al.* v. *Grand Design RV, LLC,* Case IPR2022-00411, U.S. Pat. No. 10,046,690, 4 pages.

\* cited by examiner

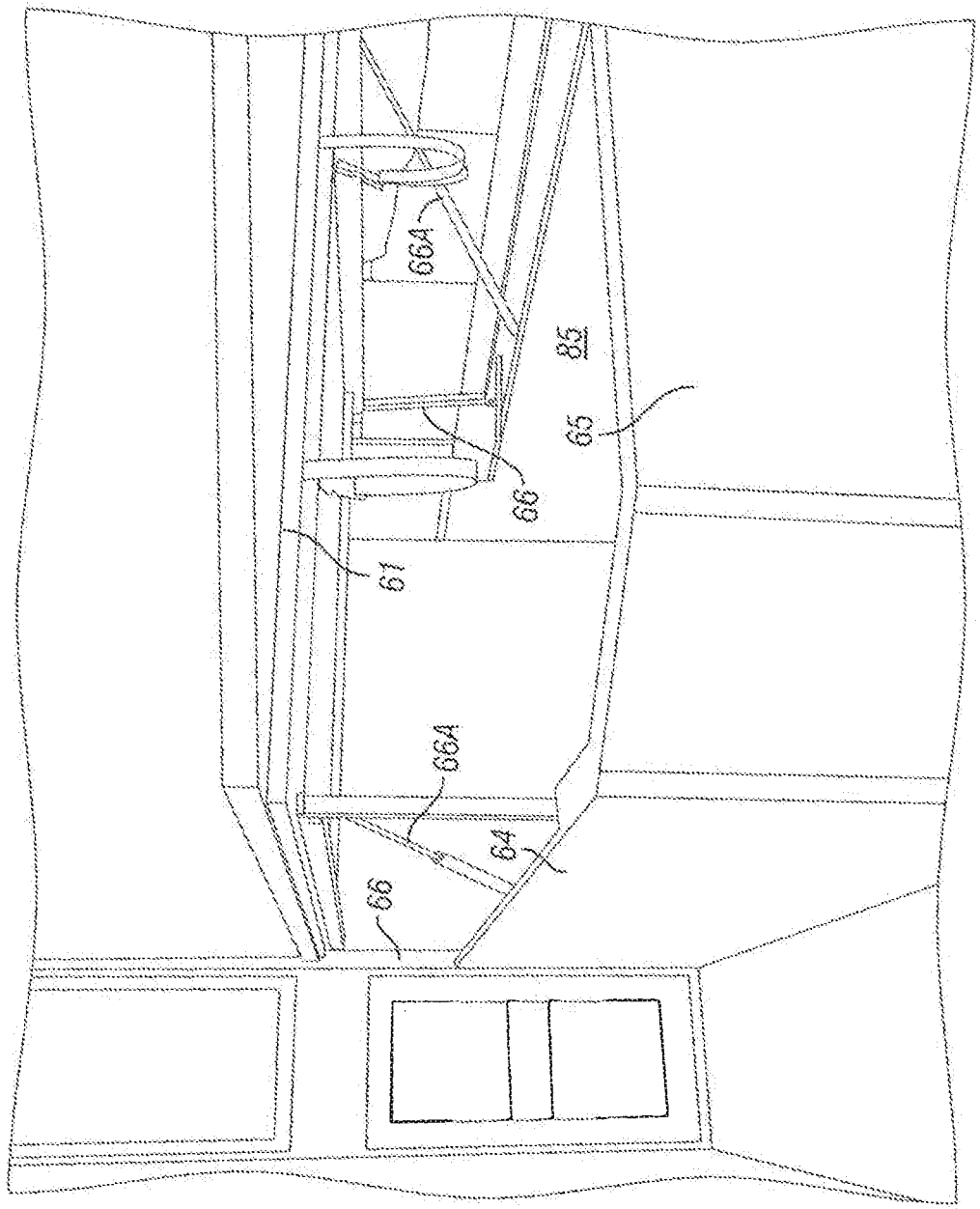

TOY HAULER RECREATIONAL VEHICLE

CROSS-REFERENCE TO RELATED APPLICATION

This application is a Continuation of U.S. patent application Ser. No. 16/058,518, filed Aug. 8, 2018, which is a Continuation of U.S. patent application Ser. No. 15/267,562, filed Sep. 16, 2016, now issued as U.S. Pat. No. 10,046,690, both of which are herein incorporated by reference.

TECHNICAL FIELD

The present invention relates to recreational vehicles and, more particularly, to a toy hauler recreational vehicle.

SUMMARY

In one embodiment of the present invention, a recreational vehicle includes a first living area having a floor, a second living area having a floor located at a level below the floor of the first living area, a third living area having a floor located at a level above the level of the floor of the second living area and a bed located in the third living area. The bed includes a platform supported above the floor of the third living area by a support structure. The support structure includes a first side, a second side and an end. The platform has an upper surface and a lower surface and is movable from a first position in which the lower surface of the platform is located adjacent the support structure to a second position in which the lower surface of the platform is spaced above and apart from the support structure. The recreational vehicle further includes a garage located below the third living area. The garage includes a floor, a first side wall, a front end, a second side wall and a ceiling defined at least in part by the lower surface of the bed platform.

In one embodiment of the invention, the garage includes a second ceiling located closer to the floor of the garage than the ceiling. In another embodiment of the invention, the ceiling is the lower surface of the bed platform.

A recreational vehicle according to another embodiment of the present invention includes a first living area having a floor, a second living area having a floor located at a level below the floor of the first living area, a third living area having a floor located at a level above the level of the floor of the second living area, a garage located below the third living area and a chassis. The chassis has a first section located beneath the first living area, a second section located beneath the second living area, a third section located beneath the third living area and the garage and a pair of longitudinally extending side rails extending the length of the third section and extending a portion of the length of the second section. Each of the side rails has an upper surface. The chassis further includes at least one truss located in the second section. The truss has a first end connected to one of the side rails, a second end connected to the other side rail and an upper surface located at substantially the same height as the upper surface of each of the side rails. The chassis also includes at least one beam located in the third section. The beam has a first end connected to one of the side rails, a second end connected to the other side rail and an upper surface located at a level lower than the upper surface of the truss. The third section includes an unobstructed area above the beam and between the side rails. In one embodiment, the beam supports the floor of the garage.

In another embodiment, the chassis further includes at least one reinforcing member connected to at least one of the side rails in the third section. In one embodiment, the reinforcing member is a vertically extending I-beam. In another embodiment, the chassis includes a second reinforcing member connected to at least one of the frame rails in the third section and a third reinforcing member connecting the first and second reinforcing members.

BRIEF DESCRIPTION OF THE DRAWINGS

FIG. 12 is a perspective view of another embodiment of a bed that is a component of the recreational vehicle shown in FIG. 1.

DETAILED DESCRIPTION

Figures 1, 1A:
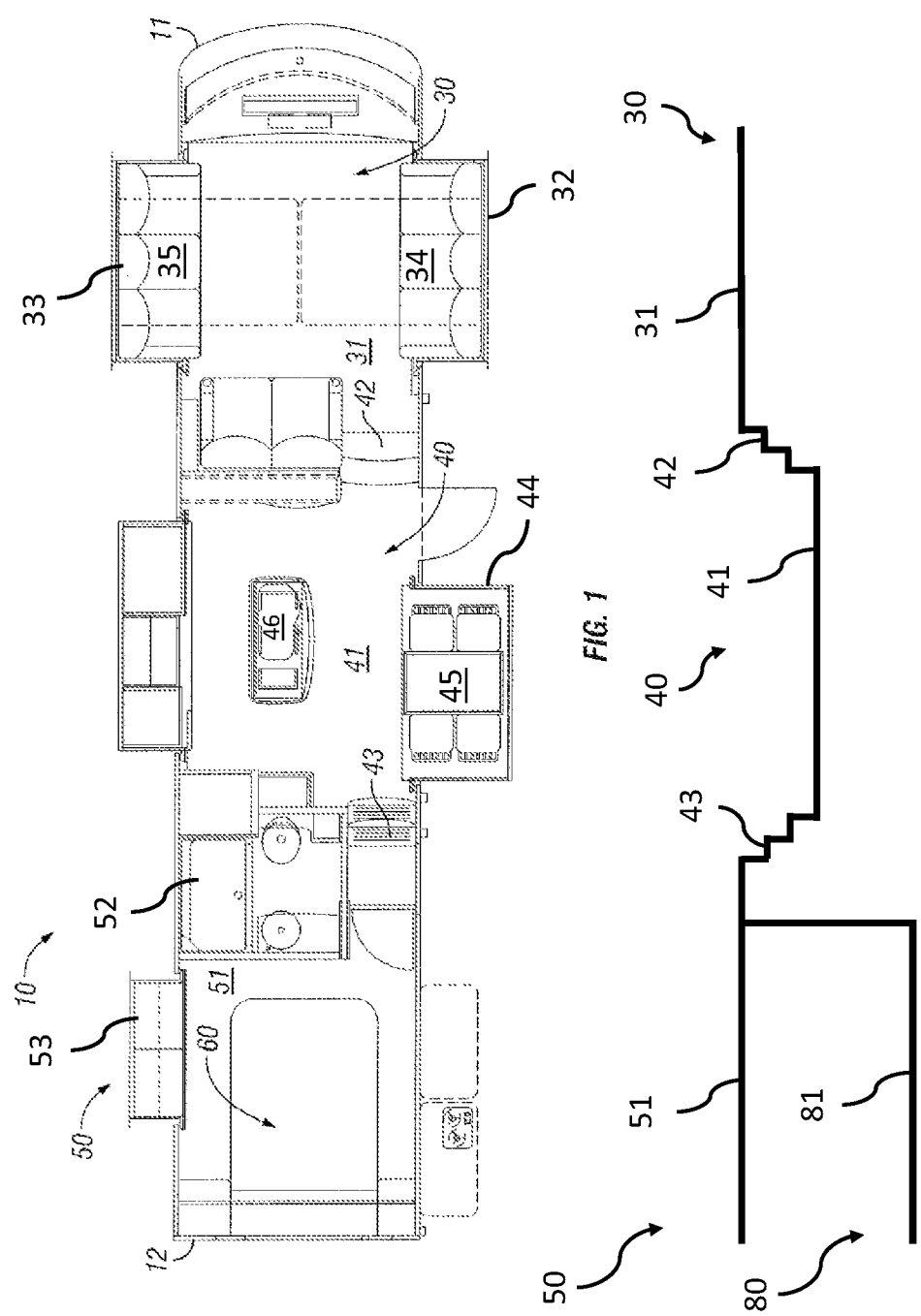
FIG. 1 is a plan view of the interior of a recreational vehicle according to one embodiment of the present invention.
FIG. 1A is a schematic elevation view of portions of the floors of the recreational vehicle of FIG. 1, as described herein.

Referring to FIG. 1, recreational vehicle 10 includes a front or hitch end 11 and a rear or garage/bedroom end 12. In the embodiment shown, the interior of recreational vehicle 10 includes a first living area 30 having a floor 31, a second living area 40 having a floor 41, and a third living area 50 having a floor 51. Floor 31 is elevated above floor 41. Steps 42 provide access between first living area 30 and second living area 40. Similarly, floor 51 is elevated above floor 41. Steps 43 provide access between second living area 40 and third living area 50. As shown in FIG. 1, the third living area 50 includes a restroom 52. FIG. 1 further shows that first living area 30 includes opposing first and second slideouts 32 and 33. The first and second slideouts 32 and 33 are each shown with furniture 34 and 35. FIG. 1 also shows the second living area 40 includes a third slideout 44, which is shown with furniture 45, and an island 46. FIG. 1 shows the third area 50 including a fourth slideout 53.

Figure 2:
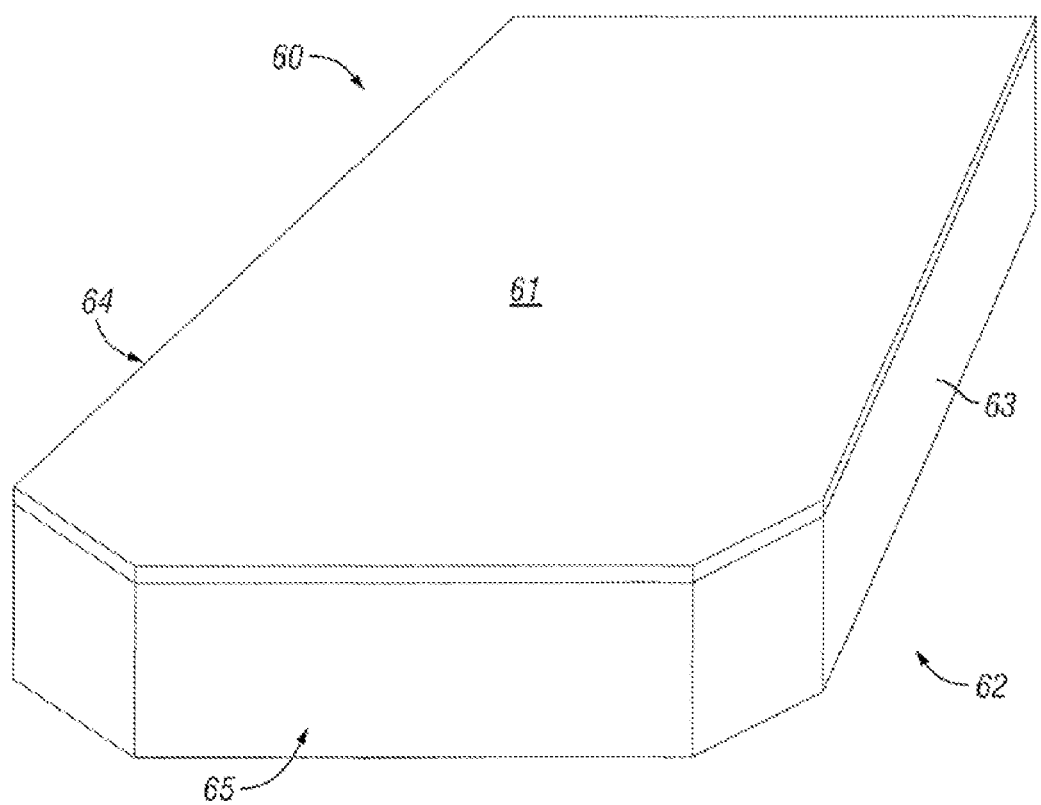
FIG. 2 is a perspective view of a first embodiment of a bed that is a component of the recreational vehicle shown in FIG. 1.

As shown in FIGS. 1 and 2, third living area 50 includes a bed 60. Bed 60 generally includes a raised platform 61 supported above floor 51 by a support structure 62. Platform 61 may be used to support a mattress or other sleeping surface. Support structure 62 generally includes a first side 63, a second side 64 and a first end 65.

Figure 3:
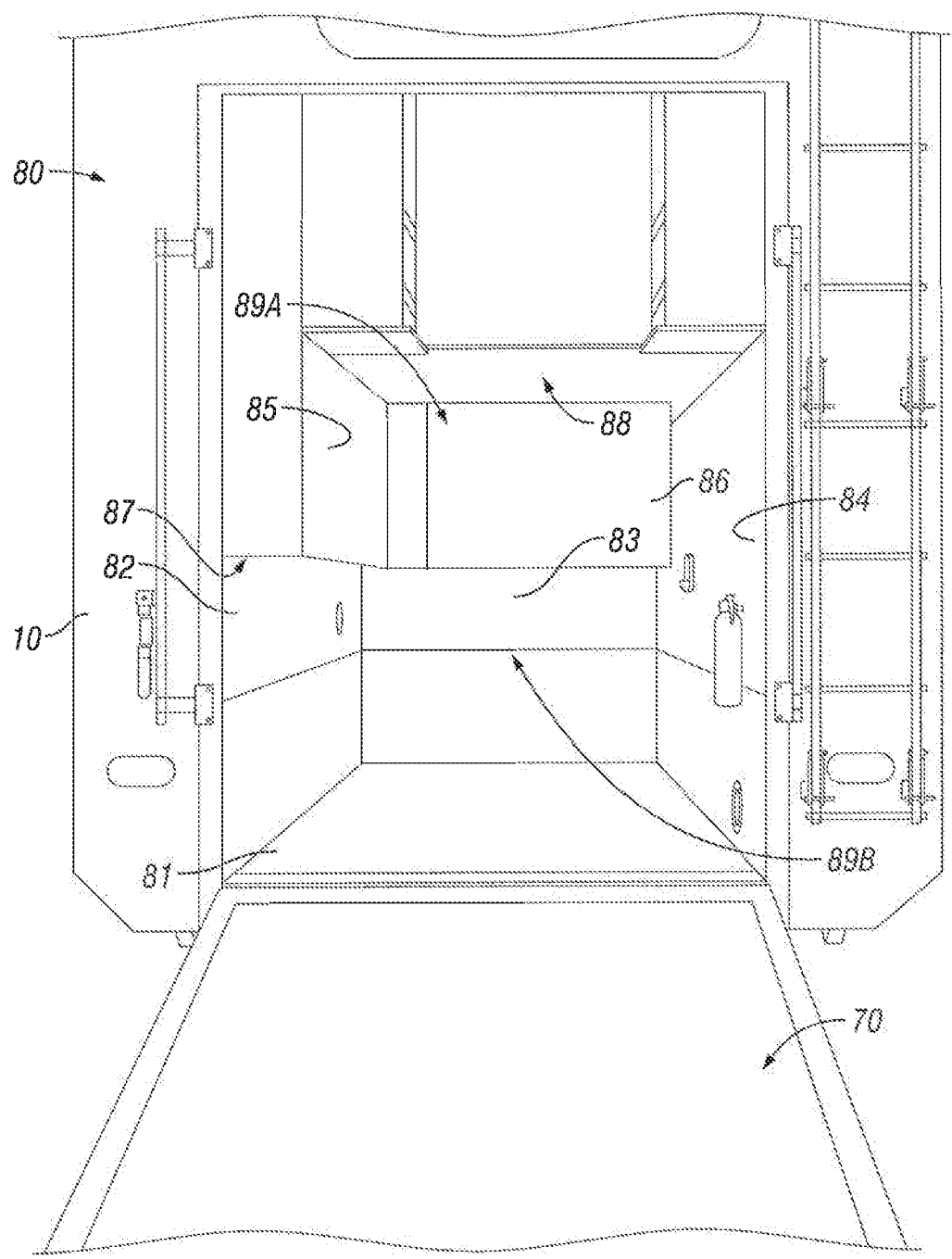
FIG. 3 is a rear elevational view of the recreational vehicle shown in FIG. 1 with the garage ramp door in the open position.

Second end 12 of recreational vehicle 10 further includes a fold-down ramp door 70 that provides access to a garage 80 located beneath third living area 50. As shown in FIG. 3, Garage 80 generally includes a floor 81, a first side wall 82, a front wall 83, a second side wall 84, an inner side wall 85, an inner front wall 86, a first or lower ceiling 87 and a second or upper ceiling 88. Lower ceiling 87 extends adjacent first side wall 82 and front wall 83 below inner side wall 85 and inner front wall 86. Upper ceiling 88 of garage 80 is positioned directly below platform 61 of bed 60 such that space 89A in garage 80 corresponds to the space below platform 61 and bounded by first side 63, second side 64 and first end 65 of support structure 62 of bed 60. Garage 80 further includes a second space 89B extending from first side wall 82 to second side wall 84 below lower ceiling 86.

Figure 4:
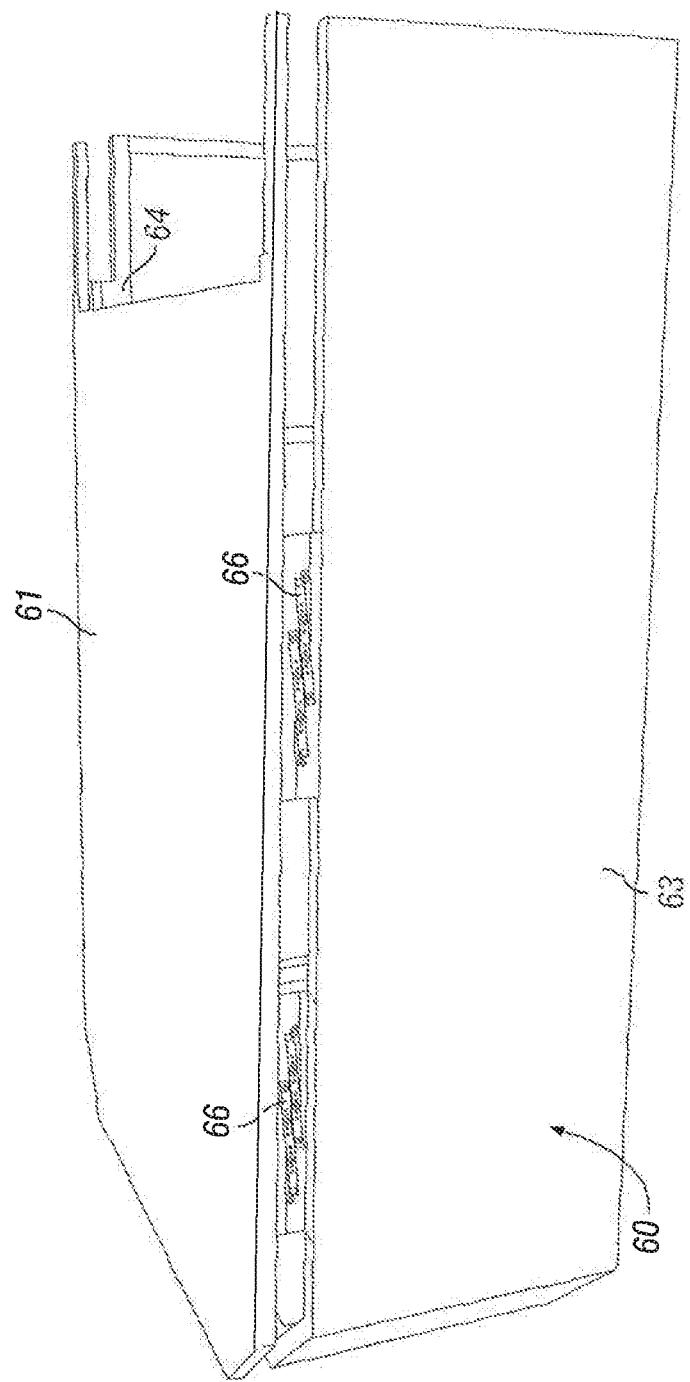
FIG. 4 is a perspective view of a second embodiment of the bed shown in FIG. 2 with the platform in the lowered position.
Figure 5:
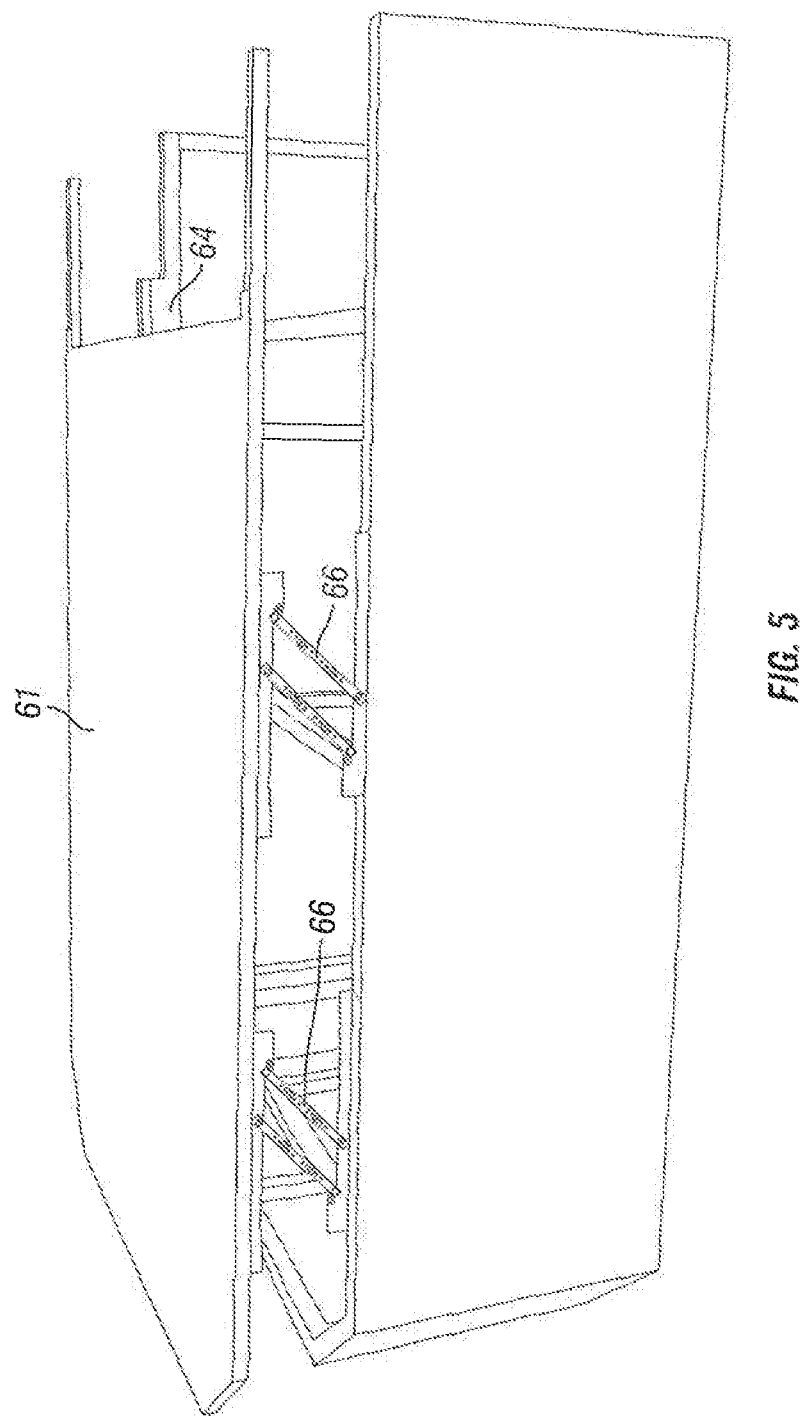
FIG. 5 is a perspective view of a second embodiment of the bed shown in FIG. 2 with the platform in an intermediate position.
Figure 6:
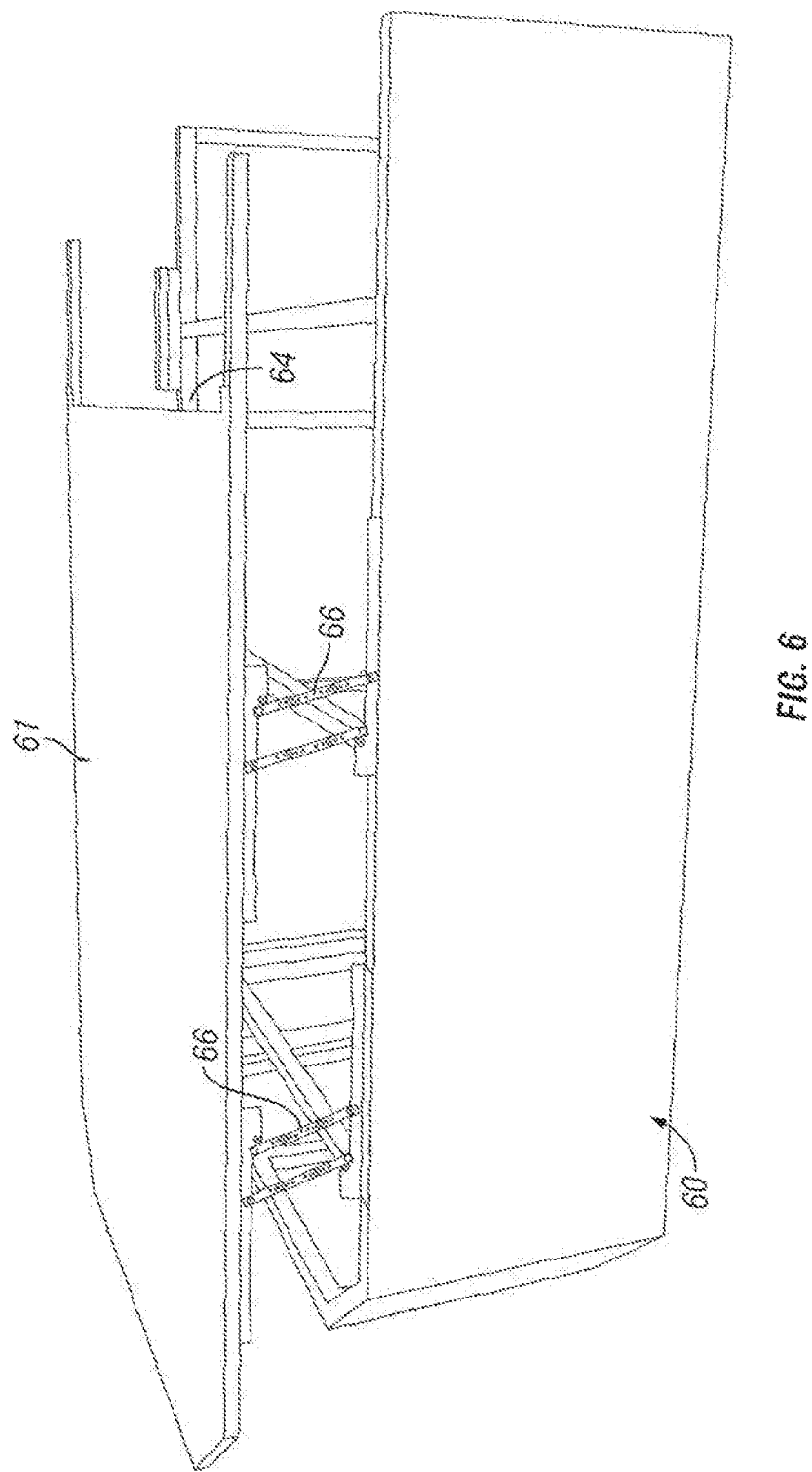
FIG. 6 is a perspective view of a second embodiment of the bed shown in FIG. 2 with the platform in the fully raised position.
Figure 7:
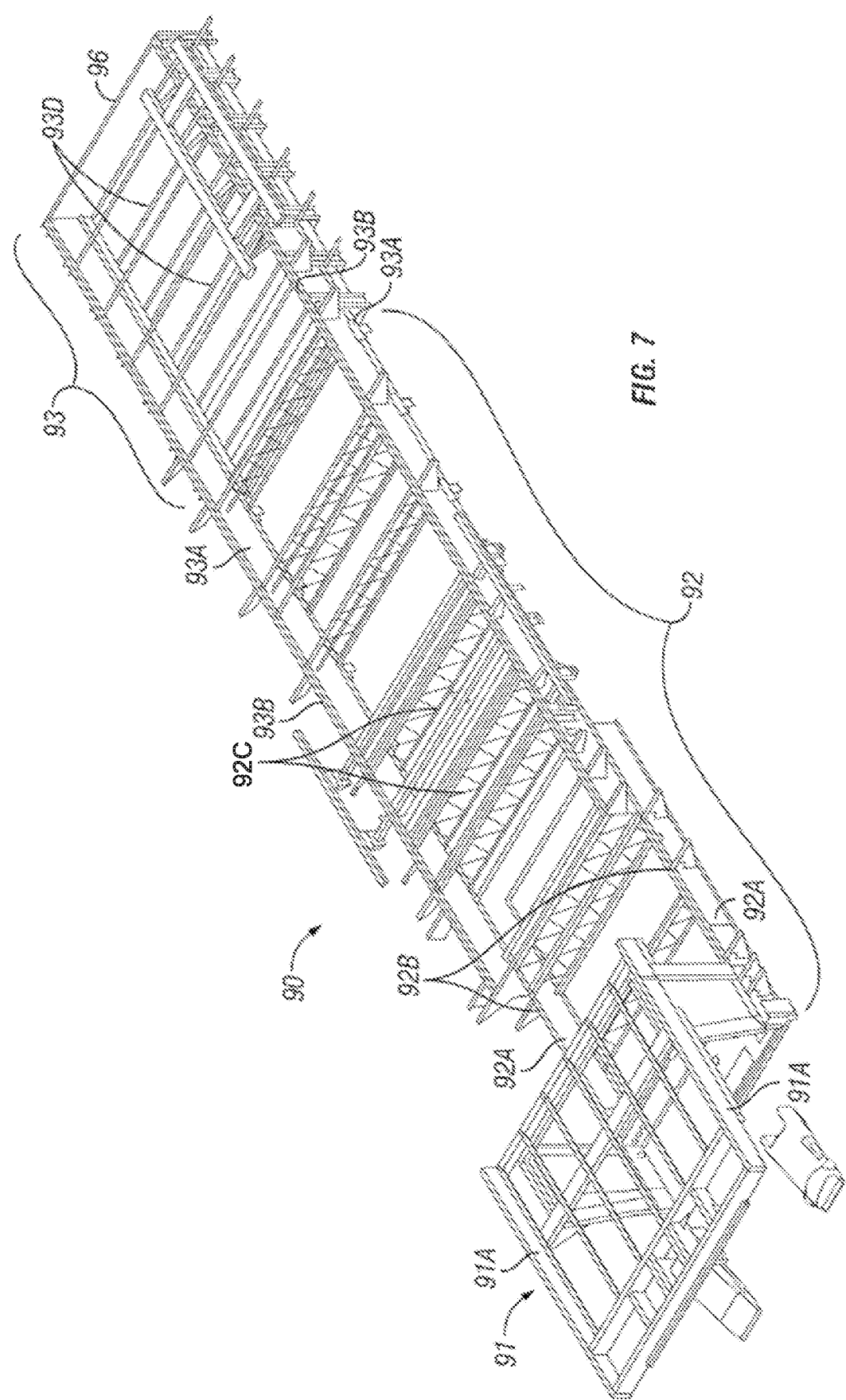
FIG. 7 is a perspective view of a chassis that is a component of the recreational vehicle shown in FIG. 1.
Figure 8:
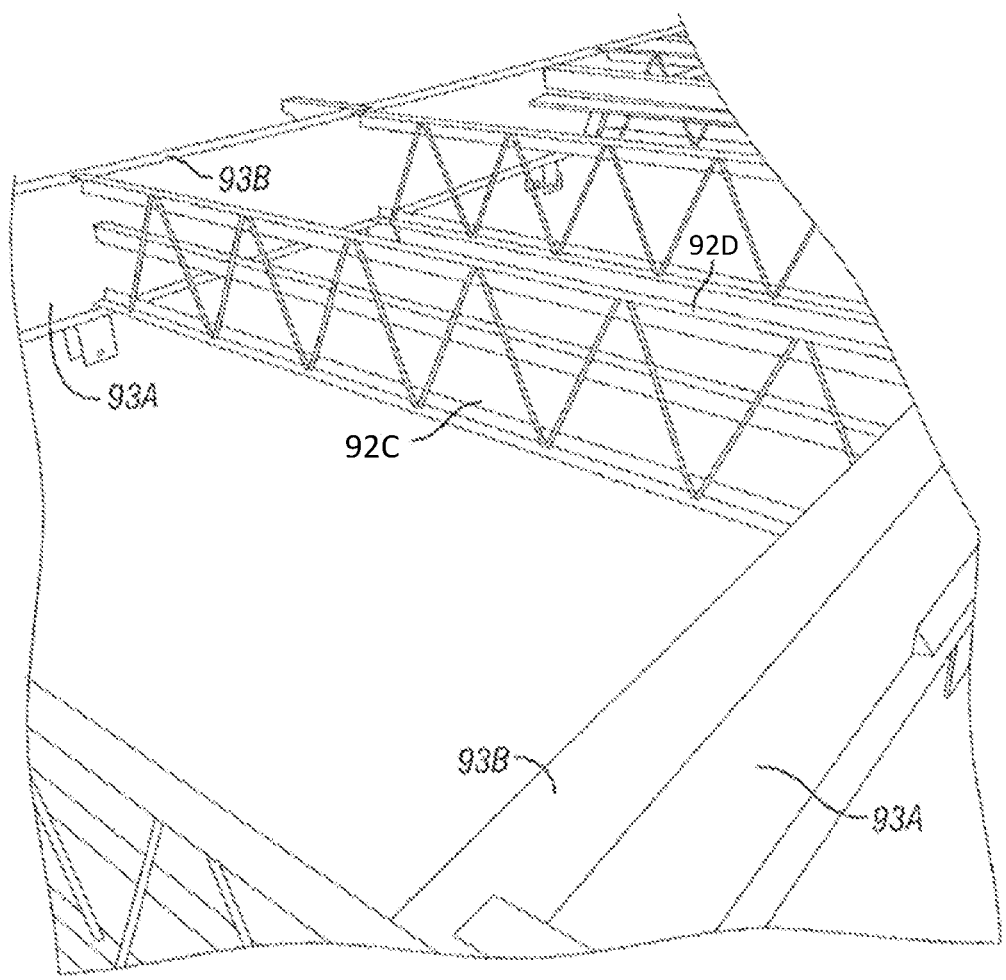
FIG. 8 is a perspective view of a section of the chassis shown in FIG. 7.
Figure 9:
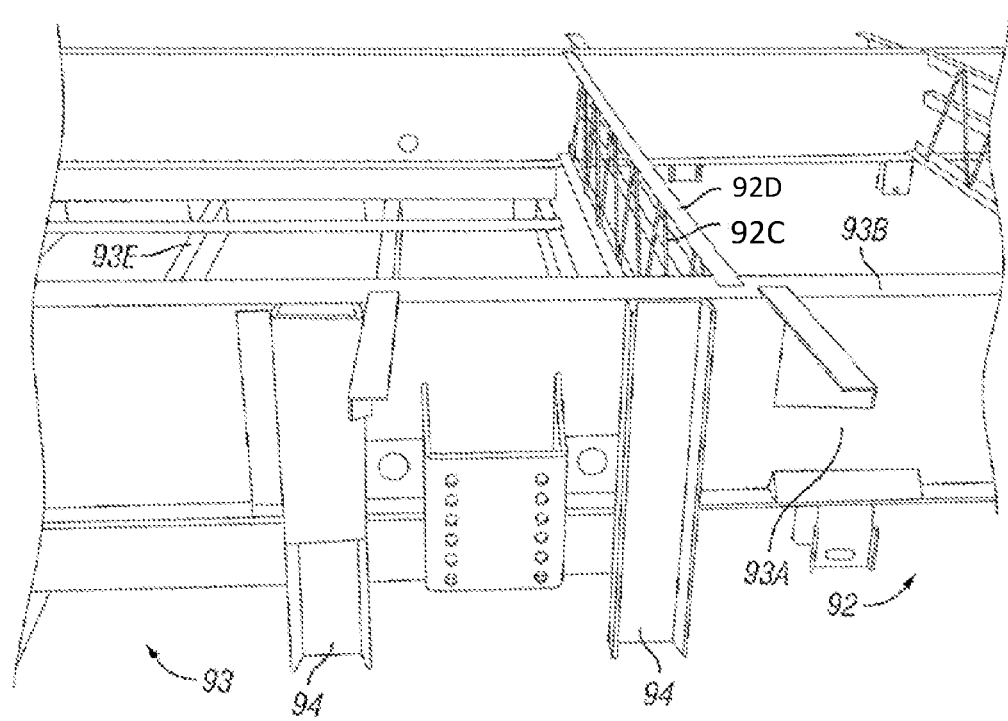
FIG. 9 is a side view of a section of the chassis shown in FIG. 7.
Figure 10:
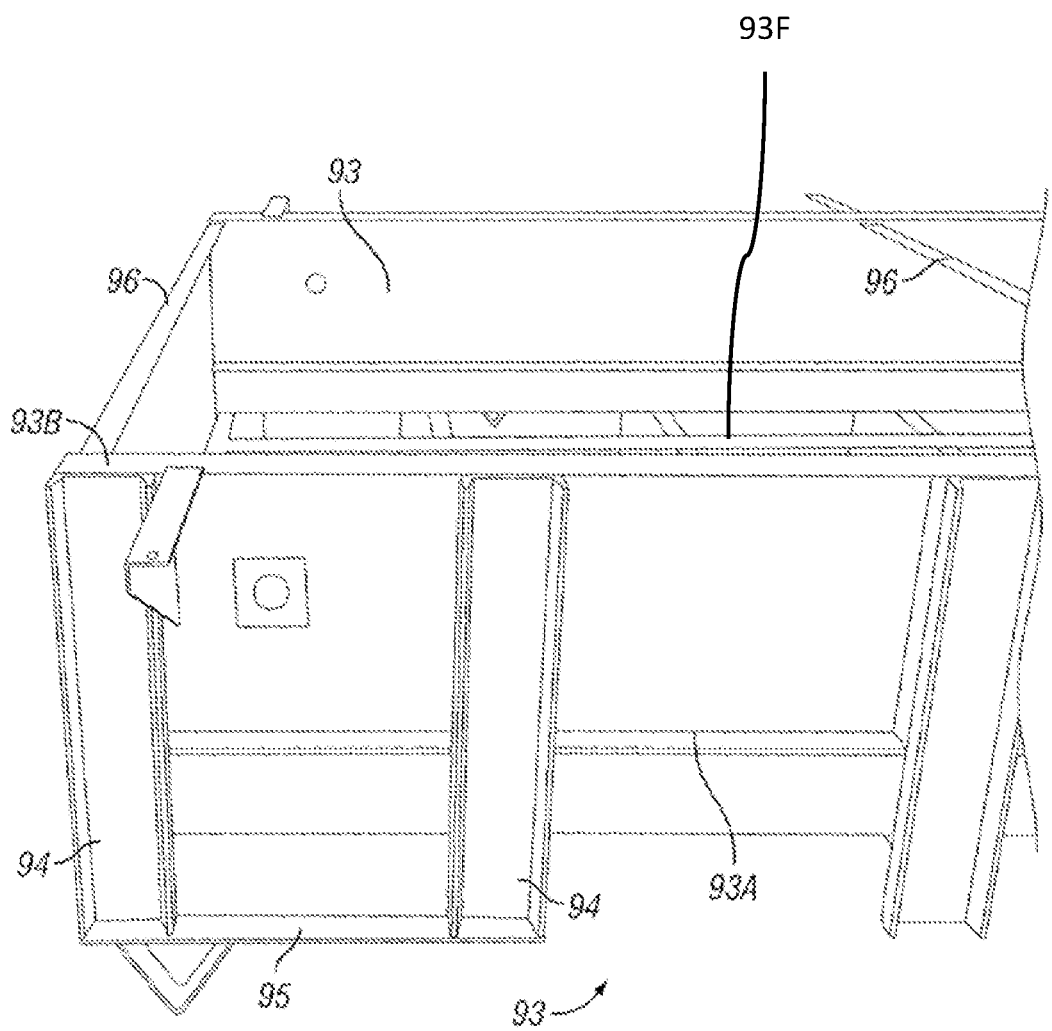
FIG. 10 is a side view of a section of the chassis shown in FIG. 7.

FIGS. 4-6 show an alternative embodiment of bed 60. In this embodiment, platform 61 is connected to first side 63 and second side 64 of support structure 62 by pivoting swing arms 66. This permits platform 61 to be selectively raised from its lowered position shown in FIG. 4 to its raised position shown in FIG. 6. To raise platform 61, the user simply lifts it and pulls or pushes it in the direction of first end 65 of support structure 62. Platform 61 is lowered by pulling or pushing it downward and away from first end 65 of support structure 62. In this manner, the height of upper ceiling 88 of garage 80 may be increased to provide greater clearance.

Referring to FIGS. 7-10, recreational vehicle 10 includes a chassis 90 having a first section 91 located beneath first living area 30, a second section 92 located beneath second living area 40 and a third section 93 located beneath third living area 50 and garage 80. First section 91 includes a first pair of two longitudinally extending side rails 91A. Second section 92 includes a second pair of longitudinally extending side rails 92A, each having an upper surface 92B. Second section 92 and third section 93 include a shared third pair of longitudinally extending side rails 93A, each having an upper surface 93B. Side rails 93A are connected to the upper surface 92B of side rails 92A.

Second section 92 further includes trusses 92C connected at opposite ends to side rails 93A. Trusses 92C have upper surfaces 92D located at substantially the same height as upper surfaces 93B of side rails 93A. Trusses 92C provide structural support and rigidity to second section 92 of chassis 90. Third section 93 of chassis 90 does not include trusses. Rather, third section 93 includes a plurality of beams 93D that are connected at opposite ends to side rails 93A. Beams 93D have upper surfaces 93E and are positioned such that upper surfaces 93E are lower than upper surfaces 92D of trusses 92C. As a result, third section 93 is an open area with no obstructions located above beams 93D and between those portions of side rails 93A that extend along third section 93. In order to provide sufficient support and rigidity to third section 93 of chassis 90 without the use of trusses 92C, a plurality of vertically extending reinforcing members 94 are connected (as by welding) to the outer surface of side rails 93A in third section 93 of chassis 90. In the embodiment shown, reinforcing members 94 are I-beams. Reinforcing members 94 may be connected at one or both ends by a reinforcing member 95 to provide added rigidity. Additional stabilizing members 96 may be connected at opposite ends to side rails 93A for purposes of stabilizing third section 93 of chassis 90 during shipping. Stabilizing members 96 are removed during constructions of recreational vehicle 10.

Figure 11:
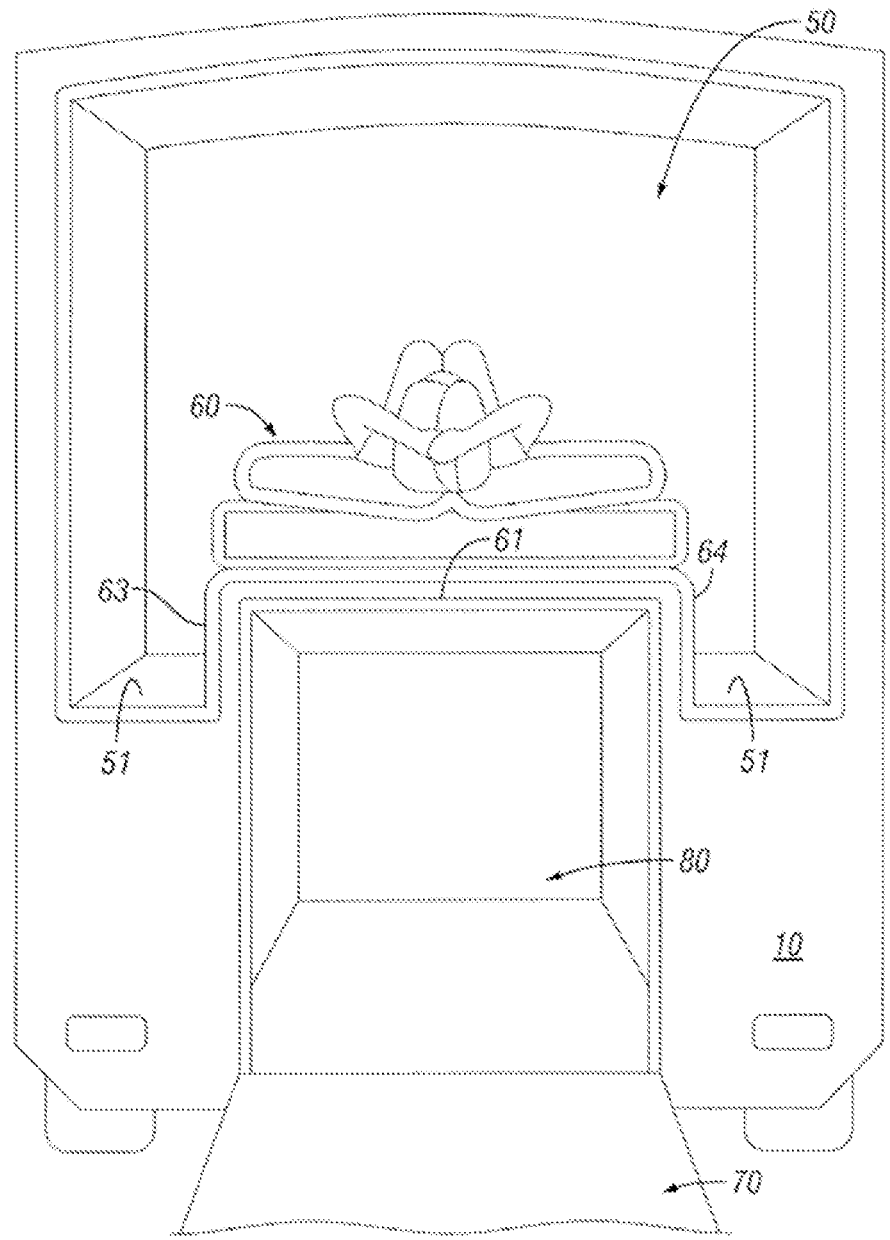
FIG. 11 is a rear schematic view of the garage and interior of the recreational vehicle shown in FIG. 1.

Beams 93D support floor 81 of garage 80. In this manner, floor 81 is lower than floor 41 of second living area 40. By lowering floor 81 of garage 80, floor 51 of third living area 50 can be lowered relative to the ceiling of third living area 50 so as to provide sufficient clearance for users to stand upright. Similarly, platform 61 of bed 60 can be raised without positioning it uncomfortably close to the ceiling of third living area 50 while at the same time providing sufficient clearance in garage 80 to accommodate snowmobiles, dirt bikes and other items typically transported in toy hauler recreational vehicles. This is shown schematically in FIG. 11.

Although the present invention has been shown and described in detail, the same is to be taken by way of illustration only and not by way of limitation. Numerous modifications can be made to the embodiments disclosed without departing from the scope of the invention. For example, bed 60 could include one or more assist devices, such as gas struts 66A, to assist in raising and lowering platform 61. This embodiment is shown in FIG. 12 with platform 61 in the raised position.

We claim:

1. A toy hauler recreational vehicle having a front hitch end and a rear garage end, the toy hauler recreational vehicle comprising:
   a front living area positioned near the front hitch end and having a first floor located at a first level;
   a middle living area having a second floor located at a second level that is lower than the first level;
   a rear living area positioned near the rear garage end, wherein the middle living area is positioned between the front living area and the rear living area;
   a garage area having a garage floor that is located lower than the second level, the garage area including a ceiling that is movable between a lower height and an upper height; and
   a bed positioned in the rear living area and movable between a lowered position and a raised position,
   wherein the ceiling is at the lower height when the bed is in the lowered position,
   wherein the ceiling is at the upper height when the bed is in the raised position.

2. The toy hauler recreational vehicle of claim 1, further comprising:
   a fold-down ramp door for providing access to the garage.

3. The toy hauler recreational vehicle of claim 1, further comprising:
   a chassis having:
      a first section located beneath the front living area, a second section located beneath the middle living area, a third section located beneath the rear living area and the garage area, and
      a pair of longitudinally extending side rails extending along at least the second section.

4. The toy hauler recreational vehicle of claim 3, wherein the pair of side rails extends along the third section, wherein the chassis includes:
   a beam located in the third section, the beam having a first end coupled to one of the pair of side rails and a second end coupled to the other side rail.

5. The toy hauler recreational vehicle of claim 4, wherein the beam supports the garage floor.

6. The toy hauler recreational vehicle of claim 4, wherein the third section does not include a truss.

7. The toy hauler recreational vehicle of claim 4, wherein the third section includes a plurality of beams coupled to the pair of side rails.

8. The toy hauler recreational vehicle of claim 4, further comprising:
a truss located in the second section, the truss having a first end coupled to one of the pair of side rails and a second end coupled to the other side rail.

9. The toy hauler recreational vehicle of claim 1, wherein the rear living area includes a third floor located at a third level, wherein the second floor of the middle living area is located at a level that is lower than the third level.

10. The toy hauler recreational vehicle of claim 9, wherein the bed is positioned higher above the third floor in the raised position than in the lowered position.

11. The toy hauler recreational vehicle of claim 1, wherein the rear living area includes a restroom.

12. The toy hauler recreational vehicle of claim 1, wherein the front living area includes first and second opposing slideouts.

13. The toy hauler recreational vehicle of claim 12, wherein the middle living area includes a third slideout.

14. The toy hauler recreational vehicle of claim 13, wherein the opposing first and second slideouts include furniture.

15. The toy hauler recreational vehicle of claim 14, wherein the third slideout includes furniture.

16. The toy hauler recreational vehicle of claim 14, wherein the rear living area includes a fourth slideout.

17. The toy hauler recreational vehicle of claim 16, wherein the middle living area includes an island.

18. The toy hauler recreational vehicle of claim 1, wherein the bed includes a platform independently movable with respect to a floor of the rear living area.

19. The toy hauler recreational vehicle of claim 18, wherein the movable platform supports a mattress of the bed, wherein a bottom surface of the movable platform defines, at least in part, the ceiling.

20. The toy hauler recreational vehicle of claim 1, wherein the garage area is defined, at least in part, by the garage floor, a first side wall, an inner side wall, a front wall, an inner front wall, a second side wall, a ramp door, the ceiling, and a lower ceiling that is positioned below the ceiling and above the garage floor.

* * * * *